(12) United States Patent
Henry et al.

(10) Patent No.: US 6,453,412 B1
(45) Date of Patent: Sep. 17, 2002

(54) METHOD AND APPARATUS FOR REISSUING PAIRED MMX INSTRUCTIONS SINGLY DURING EXCEPTION HANDLING

(75) Inventors: G. Glenn Henry, Austin, TX (US); Terry Parks, Austin, TX (US)

(73) Assignee: IP First L.L.C., Fremont, CA (US)

( * ) Notice: Subject to any disclaimer, the term of this patent is extended or adjusted under 35 U.S.C. 154(b) by 0 days.

(21) Appl. No.: 09/357,703

(22) Filed: Jul. 20, 1999

(51) Int. Cl.[7] .............................. G06F 9/48; G06F 9/40
(52) U.S. Cl. ........................ 712/244; 712/214; 712/21
(58) Field of Search .................... 712/206, 22, 229, 712/226, 26, 244, 214

(56) References Cited

U.S. PATENT DOCUMENTS

| | | | | |
|---|---|---|---|---|
| 5,075,844 A | * | 12/1991 | Jardine et al. | 712/218 |
| 5,404,472 A | * | 4/1995 | Kurosawa et al. | 712/229 |
| 5,475,824 A | * | 12/1995 | Grochowski et al. | 712/206 |
| 5,619,667 A | | 4/1997 | Henry et al. | 712/208 |
| 5,764,942 A | * | 6/1998 | Kahle et al. | 712/214 |
| 6,108,768 A | * | 8/2000 | Koppala et al. | 712/214 |

\* cited by examiner

*Primary Examiner*—Thomas Lee
*Assistant Examiner*—James K. Trujillo
(74) *Attorney, Agent, or Firm*—Richard K. Huffman; James W. Huffman

(57) ABSTRACT

In a computer having a single execution pipeline, the invention provides a method for executing paired MMX-type instructions. The method includes executing two MMX-type instructions as paired MMX instructions. If execution of the paired MMX instructions causes an exception, pairing of instructions is disabled, and the two MMX-type instructions are re-executed in sequential fashion. Paired execution is re-enabled following re-execution of the two MMX-type instructions.

7 Claims, 3 Drawing Sheets

METHOD AND APPARATUS FOR REISSUING PAIRED MMX INSTRUCTIONS SINGLY DURING EXCEPTION HANDLING

CROSS-REFERENCE TO RELATED APPLICATIONS

This application is related to the following co-pending U.S. Patent Applications, all of which have a common assignee and common inventors, and the entire contents of each which are herein incorporated by reference for all purposes.

| Ser. No. | FILING DATE | DOCKET NUMBER | TITLE |
| --- | --- | --- | --- |
| 09349441 | 7/9/99 | CNTR. 1428 | METHOD AND APPARATUS FOR TRACKING COHERENCY OF DUAL FLOATING POINT AND MMX REGISTER FILES |
| 09344439 | 6/25/99 | CNTR. 1429 | STATUS REGISTER ASSOCIATED WITH MMX REGISTER FILE FOR TRACKING WRITES |
| 09357419 | 7/20/99 | CNTR. 1430 | METHOD AND APPARATUS FOR SELECTIVE WRITING OF INCOHERENT MMX REGISTERS |

BACKGROUND OF THE INVENTION

This invention relates generally to digital computers, and particularly to digital computers capable of executing instructions in parallel.

Traditional computers which receive a sequence of instructions and execute the sequence one instruction at a time are known. The instructions executed by these computers operate on single-valued objects and hence are referred to as "scalar" machines. The operational speed of traditional scalar computers has been pushed to its limits by advances in circuit technology and computer architecture. However, with each new generation of machines, new mechanisms for accelerating must be devised for traditional scalar machines.

A common approach is instruction pipelining. A pipelined processor decodes traditional macro- or assembly-level instructions into a sequence of micro-instructions. The micro-instructions are distributed across a series of sequentially organized execution stages: fetch, translate/decode, register access, address calculation, data modify, and data write. Pipeline execution enables more than one macro-instruction to be processed at a time.

Another approach for accelerating the computational speed of single-processor devices is found in the RISC (reduced instruction set computer) architecture that employs a limited set of very simple instructions. An approach taken along more traditional lines is the CISC (complex instruction set computer) architecture which is based upon a minimal set of complex multi-operand instructions. Adapting an existing scalar computer architecture would require a fundamental alteration of its underlying structure. More significantly, the consequent change to its instruction set would require substantial re-investment by software vendors to in order to produce code that could run on such a machine.

In an effort to apply to scalar machines some of the benefits realized with RISC machines, so-called "superscalar" computers have been developed. These machines are essentially scalar machines whose performance is increased by adapting them to execute more than one instruction at a time from an instruction stream including a sequence of single scalar instructions. These machines typically decide at instruction execution time whether two or more instructions in a sequence of scalar instructions may be executed in parallel. The decision is based upon the operation codes (OP codes) of the instructions and on data dependencies which may exist between instructions. An OP code signifies the computational hardware required for an instruction. In general, it is not possible to concurrently execute two or more instructions which utilize the same hardware (a hardware dependency) or the same operand (a data dependency). These hardware and data dependencies prevent the parallel execution of some instruction combinations. In these cases, the affected instructions must be executed serially.

The foregoing detection and recovery schemes require complex hardware to track the progress of each instruction, and determine which, if either of the instructions, creates an exception. The tracking mechanisms usually send down, along with each instruction, the address for that instruction, in addition to other state or control information necessary to pick up execution of the instruction at the time of the exception. The hardware associated with tracking each instruction in a pipeline, for multiple instruction paths, is costly and complex. This disadvantage becomes even more pronounced as the complexity of the instruction set increases.

There is a need for a mechanism which provides parallel execution paths and at the same time facilitates exception handling. It is desirable to provide a detection and recovery scheme that does not require the use of complex hardware, thus easing the design effort and minimizing the system cost in terms of needed silicon and power consumption.

SUMMARY OF THE INVENTION

One aspect of the present invention provides, in a computer having a single execution pipeline, a method for executing paired MMX-type instructions. The method includes executing two MMX-type instructions as paired MMX instructions; if execution of the paired MMX instructions causes an exception, disabling paired execution, and re-executing the two MMX-type instructions in sequential fashion; and enabling paired execution following the re-executing.

Another aspect of the present invention comprehends, in a computing device, a method for executing instructions. The method includes fetching a first instruction; prior to execution of the first instruction, fetching a second instruction; determining whether the first and second instructions are both MMX-type instructions and, if the first and second instructions are not both MMX-type instructions, then sequentially executing the first and second instructions; if the first and second instructions are both MMX-type instructions, determining whether both MMX-type instructions can be executed in parallel; if both MMX-type instructions can be executed in parallel, then feeding both MMX-type instructions to an execution unit, whereby both MMX-type instructions are executed in parallel; if an exception occurs during parallel execution of both MMX-type instructions, disabling parallel execution and executing both MMX-type instructions sequentially; and re-enabling parallel execution following sequential execution of a second one of both MMX-type instructions.

A further aspect of the present invention contemplates a computing device. The computing device has an MMX execution and a translation unit. The MMX execution unit receives micro-instructions for execution. The MMX execution unit can execute two micro-instructions in parallel. The translation unit is coupled to the MMX execution unit. The translation unit determines whether a sequential pair of MMX-type instructions can be executed in parallel, and issues a first micro-instruction and a second micro-instruction to the MMX execution unit for parallel execution, where, upon occurrence of an exception during paired execution, the translation unit re-issues the first and second micro-instructions to the MMX execution unit for sequential execution, and where, upon completion of sequential execution, the translation unit allows subsequent pairs of the MMX-type instructions to be paired for parallel execution.

Yet another aspect of the present invention comprehends a processor that has an MMX execution unit, exception handling logic, and a translation unit. The MMX execution unit receives micro-instructions for execution. The MMX execution unit can execute two micro-instructions in parallel, and is configured to detect a paired exception that occurs during parallel execution of the two micro-instructions. The exception handling logic is coupled to the MMX execution unit. The exception handling logic handles exceptions that occur during execution of sequentially executed micro instructions, and indicates an occurrence of the paired exception. The translation unit is coupled to the exception handling logic. The translation unit receives indication of the occurrence, and disables parallel execution, and issues a first of the two micro-instructions followed by a second of the two micro-instructions for sequential execution, and re-enables parallel execution following issue of the second of the two-micro-instructions.

DESCRIPTION OF THE SPECIFIC EMBODIMENTS

Figure 1:
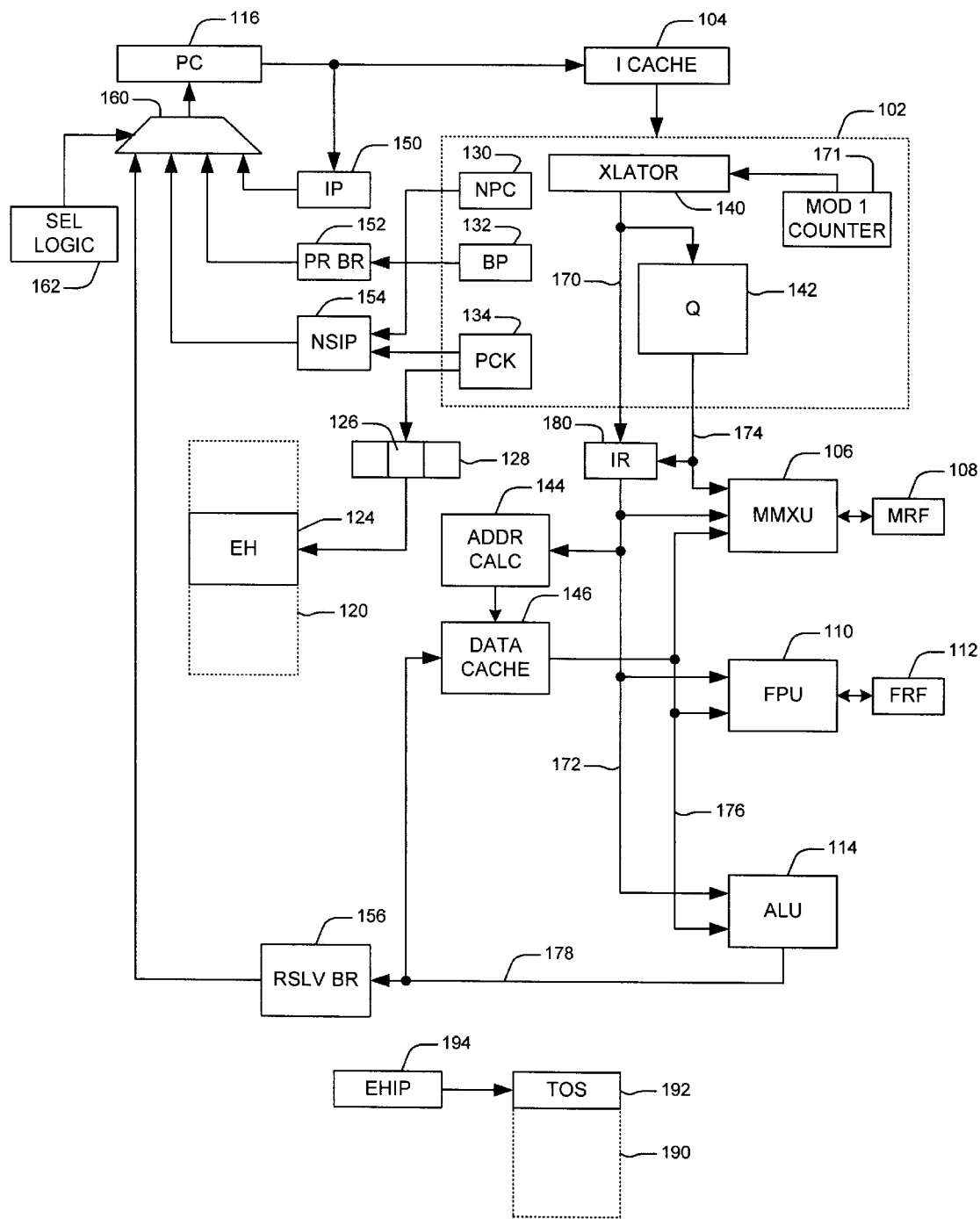
FIG. 1 presents a block diagram of the logic related to the execution of paired MMX instructions in accordance with the invention.

Referring to FIG. 1, an instruction execution unit in accordance with the present invention includes a translation circuit 102 for receiving and decoding macro-level machine language instructions. An instruction cache 104 provides translation unit 102 with high speed access to the most frequently used machine instructions. A program counter 116 points to the next instruction to be transferred into translation unit 102. Program counter 116 feeds its output to instruction cache 104 and to instruction pointer 150. The output of instruction pointer 150 feeds into an input of a mux 160. The program counter receives input from mux 160. The output of mux 160 is determined by selection logic 162.

Instruction pointer 150 contains the address of the currently decoded instruction. If any of the micro-instructions associated with a decoded macro-level instruction create an exception, an exception handler associated with the offending micro-instruction is executed. Upon completion of the exception handler, the contents of instruction pointer 150 is retrieved and dumped into PC 116, where the macro-level instruction is re-executed.

Translation unit 102 includes translation logic 140 for receiving macro-level instructions from instruction cache 104, usually by way of an instruction buffer (not shown). Translation logic 140 decodes the macro-level instructions into a corresponding sequence of micro-instructions. The translation unit then feeds the micro-instructions downstream, one at a time, via bus 170. Translation unit 102 can be implemented using any of a number of known design methods, including table lookup mechanisms, using combinatorial logic, or a mixture of both methodologies. Bus 170 is coupled to instruction register 180. The micro-instructions feed into to instruction register 180, one at a time via bus 170, which in turn provides the micro-instructions to execution units downstream.

In accordance with a preferred embodiment of the invention, an instruction queue 142 is provided as a temporary store of micro-instructions received from bus 170. The output of instruction queue 142 also feeds micro-instructions to instruction register 180 by way of a bus 174. This dual-bus mechanism for supplying micro-instructions to instruction register 180 avoids occurrences of execution stalls. This aspect of the preferred embodiment recruits the assistance of additional control logic which is more fully described in U.S. Pat. No. 5,619,667, assigned to the assignee of the present invention, and is herein incorporated by reference.

Translation unit 102 further includes NPC (next program counter) logic 130 for producing the default address of the next instruction to be executed; so-called "default" because the address of the actual next instruction may change due to a branch instruction. NPC logic 130 is typically implemented using an adder circuit to add an offset value to the current program counter, PC 116. The specific offset value will vary depending on the size of the current instruction and is determined by translation logic 140. NPC logic 130 feeds its address into an NSIP (next sequential instruction pointer) register 154. The output of NSIP register 154 is provided to another input of mux 160.

The translation unit 102 includes predictive branch logic 132 to produce a speculative branch address using a dynamic branch prediction scheme. Various dynamic branch prediction mechanisms are known. For example, a branch history table (branch prediction buffer) can be used wherein a portion of the address of the branch instruction is used to index the buffer. The buffer contains bits indicating whether a branch instruction was recently taken or not. Another scheme uses a branch-target buffer to store the predicted address for the next instruction after a branch. Each branch prediction method produces a predicted branch address. The computed predicted branch address feeds into prediction branch register 152. The output of prediction branch register 152 is provided to yet another input of mux 160.

A pair check unit 134 monitors the instructions being decoded and detects the occurrence of two successive MMX-type instructions. The pair check unit then determines whether the two successive MMX-type instructions are "pairable." Two MMX-type instructions are deemed pairable (i.e. executed as paired MMX instructions) if they can be simultaneously (or at least concurrently) executed by the MMX unit. In general, instruction pairing for parallel execution is possible if there are no resource conflicts or dependencies between them. For example, if two candidate instructions for pairing specify the same destination register, then pairing is not permitted since the outcome will be indeterminate. If one instruction specifies a register as the source and the other instruction specifies the same register as the destination register, again pairing will not be permitted because of a potential race condition arising from the conflicting use of the same register. If two instructions utilize the same resources of the processor again, the instructions cannot be paired. For example, a LOAD instruction does not require activity by ALU 114. However, an ADD instruction does require activity by ALU 114. Thus, a LOAD instruction may be paired with an ADD instruction because they do not compete for ALU 114 (or any other resource). In contrast, two ADD instructions may not be paired, because they both require activity by ALU 114.

When a pairable pair of MMX-type instructions is encountered, pair check unit 134 computes the address following the second of the two pairable MMX-type instructions and feeds that address into NSIP register 154. Pair check unit 134 further outputs a bit indicating the occurrence of two pairable MMX-instructions. By convention, the bit is logic "1" when pairable instructions are encountered and is set to logic "0" otherwise. When pair indication bit 126 is set, it signifies that two MMX-type instructions are simultaneously executing. The bit from pair check unit 134 is fed into a pair indication bit store 126. In the preferred embodiment of the invention, bit store 126 is a bit position in a status register 128.

As previously mentioned, micro-instructions feed into instruction register 180 via buses 170 and 174. Instruction register 180 in turn feeds micro-instructions downstream to subsequent execution units namely, an ALU 114, an FPU 110, and an MMX unit 106 by way of bus 172. Program instructions are classified into one of three categories: integer-type, floating point-type and MMX-type. Micro-instructions corresponding to integer-type instructions are processed in ALU (arithmetic and logic unit) 114 and include instructions such as add, subtract, bit operators (e.g. left and right shift, rotate and complement), logical operators (e.g. AND, OR, XOR), and branch operators (e.g. subroutine call and return, jump, conditional jump). Micro-instructions corresponding to floating point-type instructions are handled in FPU (floating point execution unit) 110. Micro-instructions corresponding to MMX-type instructions are processed in MMX execution unit 106. Translation unit 102 receives the macro-level instructions, decodes them into corresponding micro-instructions and then feeds them into ALU 114, FPU 110, and MMX unit 106 through instruction register 180 via bus 172. In addition to providing instruction register 180 with micro-instructions from instruction queue 142, bus 174 is also coupled to MMX unit 106 to provide micro-instructions to the MMX unit for simultaneous execution of pairable MMX-type instructions.

With respect to ALU 114, an output is provided which feeds resulting data back to a data cache 146 for storage. In the case of a branch instruction, the output of ALU 114 would be a resolved branch address. In such a case the output is provided to a resolved branch address register 156. The resolved branch address register in turn outputs its contents to still yet another input of mux 160.

With respect to MMX unit 106 and FPU 110, one embodiment of the invention realizes a single register file that is shared between between the two execution units. This configuration is similar to the standard MMX® architecture of the Pentium® processor from Intel Corporation. In a preferred embodiment of the invention, however, FPU 110 has a dedicated floating point register file 112, while an MMX register file 108 is dedicated to MMX unit 106. In this embodiment, additional control logic is needed to ensure coherency between floating point register file 112 and MMX register file 108 when switching between MMX-type instructions and floating point-type instructions. Reference is made to co-pending U.S. application No. 09/349,441; filed Jul. 9, 1999 (assignee docket No. IDT-1428), entitled "Method and Apparatus for Tracking Coherency of Dual Floating Point and MMX Register Files" and to co-pending filed Jul. 20, 1999 (assignee docket No. IDT 1430), entitled "Method and Apparatus For Selective Writing of Incoherent MMX Registers" which fully disclose this aspect of the invention.

In addition to providing micro-instructions to the execution units, bus 172 feeds portions of certain micro-instructions into an address calculation unit 144. Here, the effective address referenced in the macro-level instruction is computed. The address calculation unit accesses the addressed data in data cache 146, which in turn accesses main memory (not shown). The accessed data is then fed into the execution units over data bus 176.

Finishing up the description of FIG. 1 is the exception handling mechanism. This includes EHIP (exception handling instruction pointer) 194 and exception handling code 124. When an exception occurs, logic (not shown) loads the contents of either instruction pointer 150 or NSIP register 152 into EHIP 194. If the exception condition is a fault, then instruction pointer 150 is loaded into EHIP 194. If the exception condition is a trap, the NSIP register 154 is loaded into EHIP 194. Next, EHIP 194 is pushed onto stack 190 and control is transferred to an appropriate entry point in exception handler 124. Upon completion of the exception handler, the top-of-stack 192 is popped into PC 116 so that control is properly transferred back to the executing program. Translation unit 102 further includes a mod 1 counter 171 that is employed to restart instruction pairing after pairing has been turned off in the translation unit 102. Pairing is turned off as a result of an exception occurring during execution of paired instructions. When such an exception occurs, instruction pairing is disabled, and the paired instructions are re-executed sequentially. The counter 171 makes two counts and then re-enables pairing.

In accordance with the present invention, exception handler 124 includes code for each micro-instruction for which an exception can occur. Preferably, the exception handler is resident in a control ROM 120, such as the BIOS of a standard IBM-PC-type motherboard.

Figure 2:
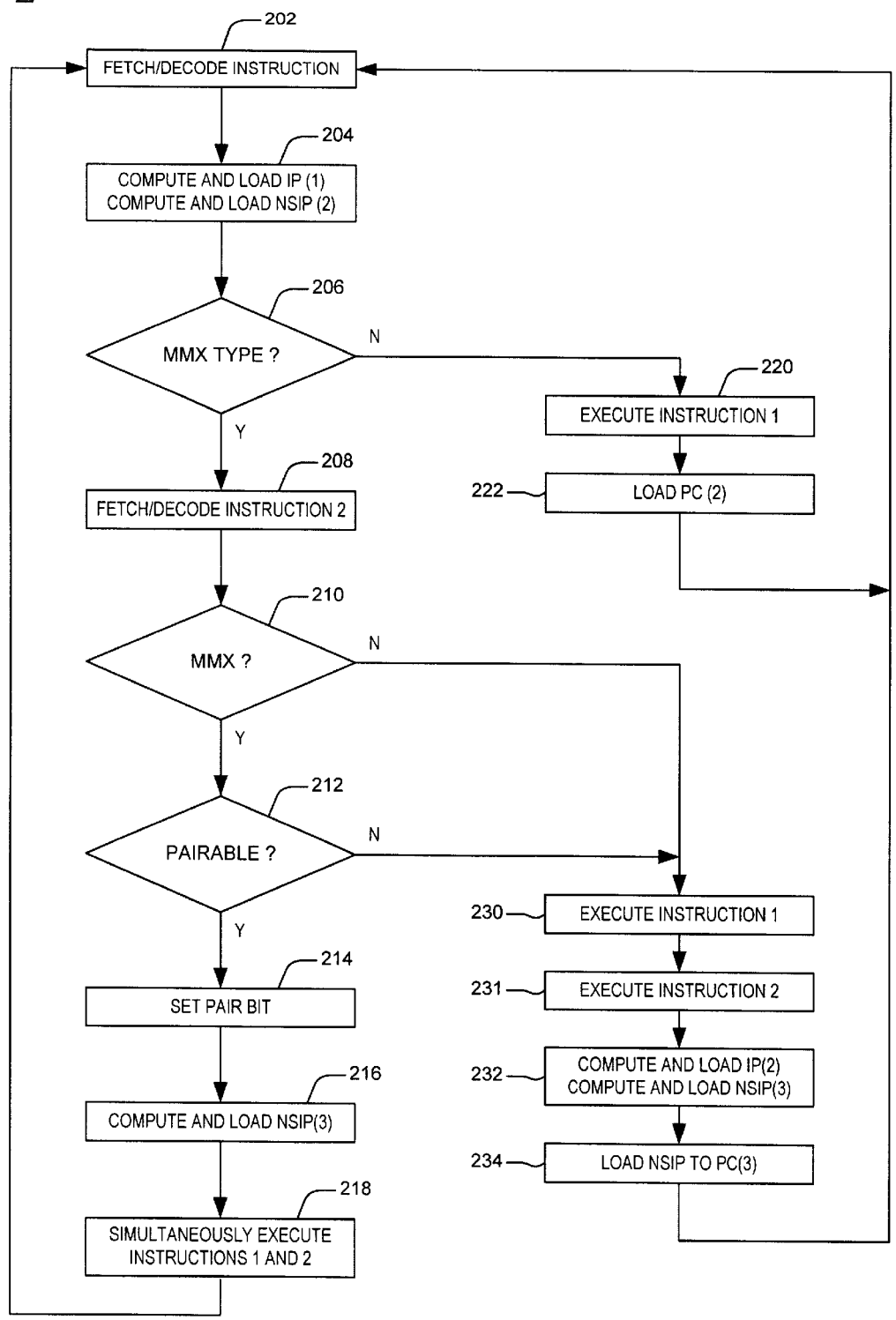
FIG. 2 is a flow chart showing the sequence of operations in the execution of paired MMX instructions.

Reference is now made to FIGS. 1 and 2 for an explanation of the pairing operation of the instruction execution unit of the invention. Beginning with step 202, a first instruction is fetched form instruction cache 104 and provided to translation unit 102. There, the macro-level instruction is decoded into its constituent micro-instructions. In step 204, instruction pointer 150 is loaded with the content of PC 116 namely, the address of the currently executing macro-level instruction. NPC logic 130 computes the default address of the next instruction and loads it into NSIP register 154. In step 206, translation logic 140 determines if the fetched instruction is an MMX-type instruction. If not, then instruction 1 is executed in sequential manner. The instruction is sent downstream to the appropriate execution unit, step 220. Any exception caused by execution of instruction 1 is handled by exception handling code 124 corresponding to exceptions associated with instruction 1. Meanwhile PC 116 is loaded with the address of the next instruction, step 222. Instruction sequencing then continues with step 202.

If translation logic detects an MMX-type instruction, then NSIP is loaded into PC 116 in order to fetch the next instruction (instruction 2) from instruction cache 104 and decoded, step 208. If the fetched instruction is not an MMX-type instruction (step 210), then instruction 1 and instruction 2 are fed downstream in sequence to be executed in sequential manner. First, instruction 1 is executed, step 230. Any exception caused by execution of instruction 1 is handled by exception handling code 124 corresponding to exceptions associated with instruction 1. Since instruction 2 has already been fetched and decoded in step 208, instruction 2 follows immediately, step 231. Any exception caused by execution of instruction 2 is handled by exception handling code 124 corresponding to exceptions associated with instruction 2. At the same time, the addresses for instruction pointer 150 and NSIP register 154 associated with instruction 2 will have been computed and loaded, step 232. PC 116 is then loaded with the next instruction address, step 234, and instruction sequencing then continues with step 202.

Continuing with the positive-determination branch of decision step 210, if instruction 2 is an MMX-type instruction, then a further determination must be made as to whether they can be executed as paired MMX instructions. Translation logic 140 does not have sufficient time to make a determination as to pairability during the translation operation. Typically, about one-half of a clock cycle is consumed to perform the translation; thus, insufficient time remains for much else. Therefore, translation logic 140 automatically pairs the two MMX instructions for simultaneous execution. The micro-instructions corresponding to each of the two MMX instructions are provided to the downstream instruction queue 142.

Pair check unit 134 examines the MMX instructions, during the next clock cycle, to determine whether they can be paired for execution as paired MMX instructions, step 212. If not, the instructions are split and executed sequentially, steps 230 and 231 Upon completion of the second instruction in step 231 NSIP register 154 is loaded into PC 116 via mux 160 in step 234. Instruction sequencing continues with step 202.

If the determination is made that the instructions are pairable (i.e. can be executed as paired MMX instructions) in decision step 212, then pair bit 126 is set in step 214. Pair check unit 134 will have computed the address following the second MMX-type instruction. NSIP register 154 is loaded with the computed address, step 216. The paired MMX instructions then proceed down instruction queue 142 into MMX unit 106 for simultaneous execution, step 218. Any exception caused by paired execution of instructions 1 and 2 is handled by exception handling code 124. Instruction pairing is disabled and instructions 1 and 2 are re-executed sequentially. Accordingly, and an exception caused by execution of instruction 2 is handled by exception handling code 124 corresponding to exceptions associated with instruction 2. pairing is re-enabled following sequential execution of instructions 1 and 2. Upon completion of the paired MMX instructions, instruction sequencing continues with step 202.

Figure 3:
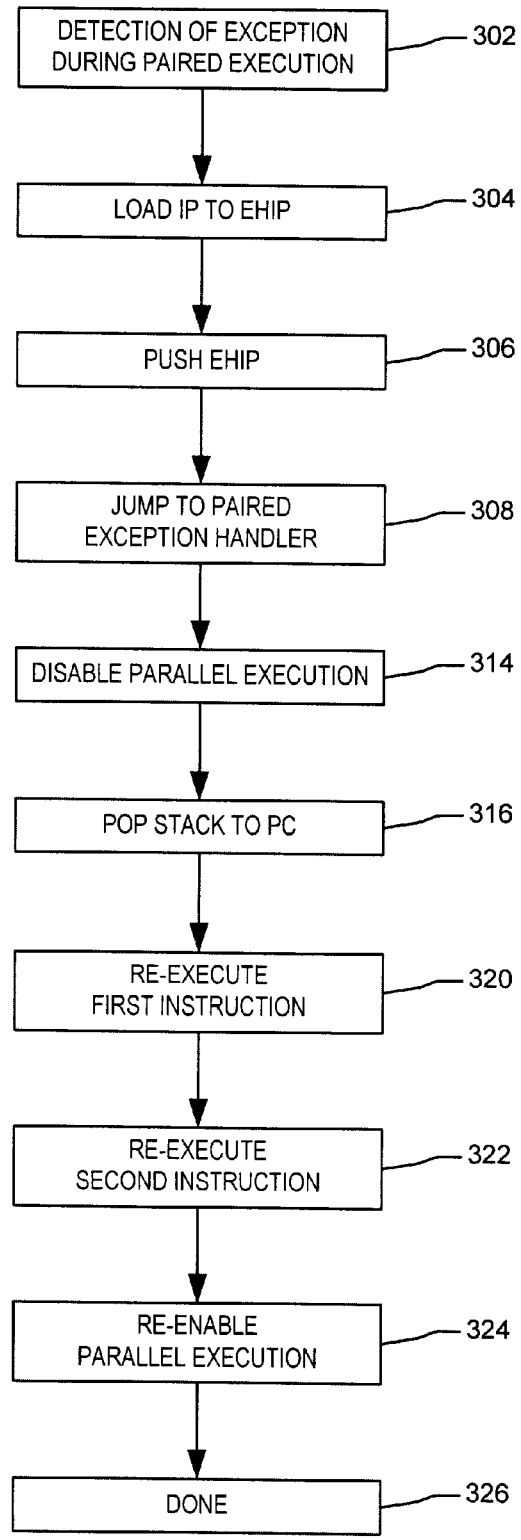
FIG. 3 is a flow chart of the exception handling process in accordance with the invention.

Refer now to FIGS. 1 and 3 for a discussion of how an exception is handled during paired execution of MMX instructions. Upon detection of a paired exception condition, step 302, exception handling logic (not shown) loads instruction pointer 150 into EHIP 194, step 304. In step 306, the contents of EHIP 194 is pushed onto stack 190. The exception handling logic then jumps to an entry point in exception handler 124 in ROM 120, step 308, and attends to the exception generating event.

In step 314 parallel execution capability in translator unit 102 is disabled. Finally in step 316, the stack is popped into PC 116. Recall, that instruction pointer 150 was pushed onto the stack prior to jumping into the exception handler. Recall further that instruction pointer 150 is set to point to the first of the two MMX instructions. Thus when the stack is popped, the address of the first MMX instruction is loaded into PC 116 from stack 190. Consequently, when instruction execution resumes, the first MMX instruction will be re-executed. Moreover, since pairing is turned off in translation unit 102, the two MMX instructions will be executed in sequential fashion, steps 320 and 322. The pairing mechanism in translation unit 102 can be restarted by a modulo-1 counter. Thus, when pairing is turned off, the counter will make two counts and turn pairing on two clocks later. step 324. At step 326, the method completes.

By saving the address of the first of the two MMX instructions, re-execution of the instructions following and exception condition will properly begin with the first instruction. Thus, even if the exception generating event occurred as a result of executing a micro-instruction corresponding to the second MMX instruction, the scheme provided by the present invention will handle the exception and correctly resume execution with the first MMX instruction.

What is claimed is:

1. In a computer having a single execution pipeline, a method for executing paired MMX-type instructions, comprising:

executing two MMX-type instructions as paired MMX instructions;

if execution of the paired MMX instructions causes an exception, disabling paired execution, and re-executing the two MMX-type instructions in sequential fashion; and enabling paired execution following said re-executing.

2. The method as recited in claim 1, further comprising:

storing an address associated with a first one of the two MMX-type instructions, wherein said re-executing comprises reading the address.

3. In a computing device, a method for executing instructions, comprising:

fetching a first instruction;

prior to execution of the first instruction, fetching a second instruction;

determining whether the first and second instructions are both MMX-type instructions and, if the first and second instructions are not both MMX-type instructions, then sequentially executing the first and second instructions;

if the first and second instructions are both MMX-type instructions, determining whether both MMX-type instructions can be executed in parallel;

if both MMX-type instructions can be executed in parallel, then feeding both MMX-type instructions to an execution unit, whereby both MMX-type instructions are executed in parallel;

if an exception occurs during parallel execution of both MMX-type instructions, disabling parallel execution and executing both MMX-type instructions sequentially; and re-enabling parallel execution following sequential execution of a second one of both MMX-type instructions.

4. The method as recited in claim 3, further comprising:

storing an address associated with a first one of both MMX-type instructions, wherein said executing comprises reading the stored address to enable access of the first one of both MMX-type instructions for sequential execution.

5. A computing device, comprising:

an MMX execution unit, configured to receive micro-instructions for execution, wherein said MMX execution unit can execute two micro-instructions in parallel; and a translation unit, coupled to said MMX execution unit, for determining whether a sequential pair of MMX-type instructions can be executed in parallel, and for issuing a first micro-instruction and a second micro-instruction to said MMX execution unit for parallel execution, wherein, upon occurrence of an exception during paired execution, said translation unit re-issues said first and second micro-instructions to said MMX execution unit for sequential execution, and wherein, upon completion of said sequential execution, said translation unit allows subsequent pairs of said MMX-type instructions to be paired for parallel execution.

6. The computing device as recited in claim 5, further comprising:

exception handling logic, coupled to said translation unit, configured to read a data store containing an address of a first one of said sequential pair of MMX-type instructions, and configured to provide said address to said translation unit.

7. A processor, comprising:

an MMX execution unit, configured to receive micro-instructions for execution, wherein said MMX execution unit can execute two micro-instructions in parallel, and configured to detect a paired exception that occurs during parallel execution of said two micro-instructions;

exception handling logic, coupled to said MMX execution unit, configured to handle exceptions that occur during execution of sequentially executed micro instructions, and configured to indicate an occurrence of said paired exception; and a translation unit, coupled to said exception handling logic, configured to receive indication of said occurrence, and configured to disable parallel execution, and configured to issue a first of said two micro-instructions followed by a second of said two micro-instructions for sequential execution, and configured to re-enable said parallel execution following issue of said second of said two micro-instructions.

* * * * *